United States Patent
Hansson

(10) Patent No.: US 8,118,702 B2
(45) Date of Patent: Feb. 21, 2012

(54) POWER TOOL WITH PLANET TYPE REDUCTION GEARING

(75) Inventor: Gunnar Christer Hansson, Stockholm (SE)

(73) Assignee: Atlas Copco Tools AB, Stockholm (SE)

( * ) Notice: Subject to any disclaimer, the term of this patent is extended or adjusted under 35 U.S.C. 154(b) by 603 days.

(21) Appl. No.: 10/574,535

(22) PCT Filed: Oct. 4, 2004

(86) PCT No.: PCT/SE2004/001407
§ 371 (c)(1),
(2), (4) Date: Aug. 23, 2007

(87) PCT Pub. No.: WO2005/032770
PCT Pub. Date: Apr. 14, 2005

(65) Prior Publication Data
US 2007/0298927 A1  Dec. 27, 2007

(30) Foreign Application Priority Data
Oct. 3, 2003  (SE) ..................... 0302622

(51) Int. Cl.
*F16H 57/08* (2006.01)
*E21B 3/00* (2006.01)
(52) U.S. Cl. ...................... 475/338; 173/216
(58) Field of Classification Search .......... 475/331, 475/334, 337, 338, 346, 903, 339, 340, 341, 475/342; 173/216, 217
See application file for complete search history.

(56) References Cited

U.S. PATENT DOCUMENTS

| | | | | |
|---|---|---|---|---|
| 2,084,844 A | * | 6/1937 | Harris | 475/337 |
| 3,188,888 A | * | 6/1965 | Zink et al. | 475/338 |
| 3,245,279 A | * | 4/1966 | Baker | 74/410 |
| 4,095,323 A | * | 6/1978 | Silvestri | 29/893.1 |
| 4,147,219 A | * | 4/1979 | Wallace | 173/178 |
| 4,286,458 A | * | 9/1981 | Alexander | 73/862.21 |
| 4,554,980 A | * | 11/1985 | Doniwa | 173/176 |
| 4,620,449 A | * | 11/1986 | Borries et al. | 73/862.21 |
| 5,336,136 A | * | 8/1994 | Jacqui | 475/337 |
| 6,099,432 A | * | 8/2000 | Shirokoshi | 475/331 |
| 6,401,572 B1 | | 6/2002 | Provost | |
| 6,682,454 B2 | * | 1/2004 | Suzuki et al. | 475/263 |
| 6,931,959 B2 | * | 8/2005 | Giuriati | 74/413 |
| 2003/0139250 A1 | * | 7/2003 | Bowman | 475/338 |

FOREIGN PATENT DOCUMENTS
EP  0469557 A1  2/1992
JP  05340227 A  * 12/1993
* cited by examiner Primary Examiner — Roger Pang
(74) Attorney, Agent, or Firm — Holtz, Holtz, Goodman & Chick, PC

(57) ABSTRACT

A power tool having a rotation motor coupled to an output shaft (11) via a reduction gearing (13,14), wherein the reduction gearing (13,14) comprises at least one planetary gearing (14) with a sun gear (30), a ring gear (22), a planet wheel carrier (32) supporting two or more planet wheel units (35) each comprising two axially spaced spur gears (36,37) both secured to a spindle (38) which is rotatively journalled relative to the planet wheel carrier (32) via a bearing located between the spur gears (36,37).

4 Claims, 1 Drawing Sheet

POWER TOOL WITH PLANET TYPE REDUCTION GEARING

This application is a U.S. National Phase Application under 35 USC 371 of International Application PCT/SE2004/001407 filed Oct. 4, 2004.

FIELD OF THE INVENTION

The invention relates to a power tool in which a rotation motor is connected to an output shaft via a planet type reduction gearing.

BACKGROUND OF THE INVENTION

A common problem concerned with power tools of the above type is to minimize the dimensions of the gearing as well as the outer dimension of the tool for a certain level of torque output. In power nut runners, for instance, the motor speed is reduced in at least two stages such that in the last stage the rotation speed is quite low while the transferred torque is high. In this type of tool, it is also desirable to have a low gear ratio in the last stage, which means that the planet wheels in that stage have to have a small diameter. This means in turn that there is very little space left for the needle bearing supporting each planet wheel on the planet wheel carrier. Accordingly, the material thickness between the bases of the gear teeth and the outer race of the needle bearing will be too small, and the fatigue strain at the bases of the gear teeth will be too high to meet the demands of an acceptably long service life of the gearing.

One solution to that problem could be to make the planet wheels longer so as to distribute the torque related forces on the gear teeth over a longer distance. This will not work in practice, however, because an even gear teeth engagement and force distribution over a long gear wheel is impossible to obtain, because of torsional deflection of primarily the sun gear and the planet wheel carrier. The result would be that the tension level in the teeth will still be too high at the torque input side of the gears.

Another way to solve this problem could be to split the planet wheel bearing into two bearings located on opposite sides of the planet wheel. By this arrangement the torsional deflection of primarily the planet wheel carrier would misalign the gear teeth relative to the sun gear and the ring gear, which would result in high local gear teeth stresses on the gear teeth.

SUMMARY OF THE INVENTION

It is the main object of the invention to provide a power tool with a planet type reduction gearing having an improved planet wheel arrangement allowing small size planet wheels to be used despite a heavy torque load being transferred.

Further objects and advantages of the invention will appear from the following specification and claims.

According to one aspect of the invention, a power tool includes (i) a housing with a rotation motor, an output shaft, and a reduction gearing connecting the motor to the output shaft, and (ii) at least one planetary gearing with a sun gear, a ring gear, two or more planet wheel units, and a planet wheel carrier. Each planet wheel unit includes two axially spaced spur gears mounted on a common spindle. And the spindle is rotatively journalled relative to the planet wheel carrier via a bearing located between the two spur gears.

A preferred embodiment of the invention is described below with reference to the accompanying drawing.

DETAILED DESCRIPTION

Figure 1:
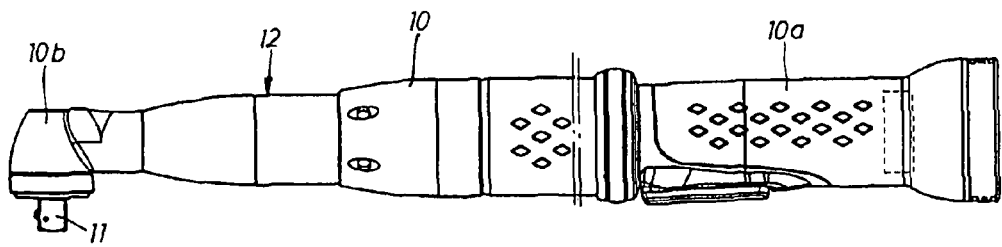
FIG. 1 shows a side view of a power tool according to the invention.

The power tool illustrated in FIG. 1 is a hand held power nut runner which comprises a housing 10 with a rear handle 10a and an angle head 10b. The tool further comprises a rotation motor (not illustrated), and output shaft 11 for carrying a nut socket, and a reduction gearing 12 connecting the motor to the output shaft 11. The purpose of the reduction gearing 12 is as usual to reduce the rotation speed of the motor and amplify the torque delivered by the output shaft 11.

Figure 2:
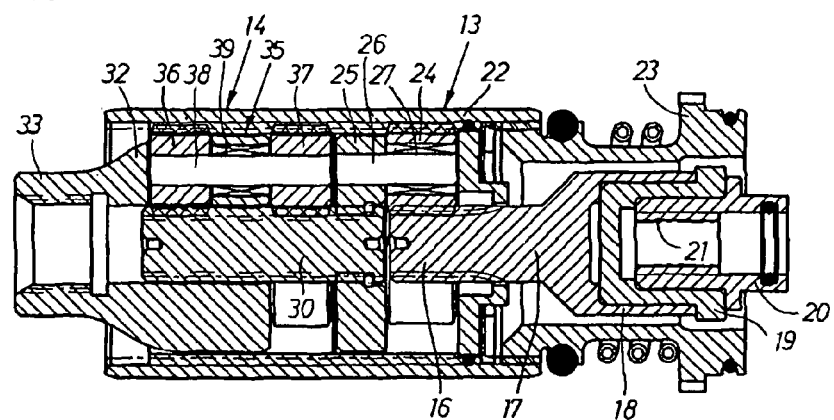
FIG. 2 shows a longitudinal section through the reduction gearing of the power tool shown in FIG. 1.
Figure 3:
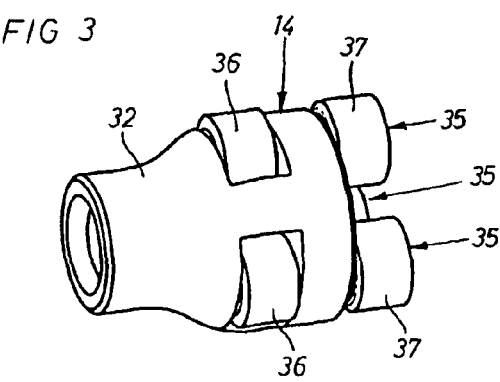
FIG. 3 shows a perspective view of the second stage planetary gearing of the reduction gearing in FIG. 2.

In FIG. 2, the reduction gearing 12 is shown in detail and comprises two planetary gearings 13,14 arranged in two consecutive stages. The gearing 13 of the first reduction stage comprises a sun gear 16 formed integrally with a drive spindle 17 connectable to the motor. At its rear end, the drive spindle 17 is provided with a coupling socket 18 which supports a coupling sleeve 19 and an intermediate sleeve 20. The intermediate sleeve 20 is formed with inner splines 21 to be engaged by matching splines on the motor shaft.

An elongate tubular ring gear 22 is secured to a support member 23 for mounting in the housing 10. The first stage planetary gearing 13 comprises a set of planet wheels 24 journalled on a planet wheel carrier 25 via stub axles 26 and needle bearings 27. The planet wheels 24 engage both the sun gear 16 and the ring gear 22 and transfer torque to the planet wheel carrier 25. The planet wheel carrier 25 is secured to a shaft 30 which is formed with gear teeth to form the sun gear of the second planetary gearing 14.

The second planetary gearing 14 comprises a planet wheel carrier 32 with a socket portion 33 coupling the gearing to the output shaft 11. On the planet wheel carrier 32 there are supported three planet wheel units 35 each comprising two separate and axially spaced spur gears 36,37 which both engage the ring gear 22 as well as the shaft 30. These spur gears 36,37 are mounted on a common spindle 38 which is journalled relative to the planet wheel carrier 32 via a needle bearing 39. One of the spur gears 36 is rigidly secured to the spindle 38, whereas the other spur gear 37 has a wringing fit on the spindle 38 for obtaining self alignment with the other spur gear 36. A wringing fit of the spur gear 37 as well as the play in the needle bearing 39 will make the two planet wheels 36,37 share the load evenly regardless of occurring torsional deflection of the planet wheel carrier 32.

Since the needle bearing 39 is located between the spur gears 36,37 instead of inside them, as in prior art, the spur gears 36,37 can be designed with relatively massive hub portions offering a good support for the gear teeth. Accordingly, the described planet wheel arrangement makes it possible to combine the demands for a reduction gearing having small size planet wheels and still being able to transfer relatively heavy torque loads. In other words, a reduction gearing is created that is particularly suitable for use in power nut runners, because a tool having the features of the described reduction gearing gets the favourable features of being slim in design for good accessibility and at the same time being able to deliver a high torque output during a long service life.

The invention claimed is:

1. A hand-held power nut runner, comprising:
    a housing with a rotation motor, an output shaft, and a reduction gearing connecting the motor to the output shaft;
    wherein the reduction gearing comprises a plurality of planetary gearing stages having a common ring gear supported in the housing, and each one of the planetary gearing stages includes a sun gear, a planet wheel carrier, and a plurality of planet wheel units engaging the ring gear and the sun gear;
    wherein each of the planet wheel units of at least one of the planetary gearing stages comprises two axially spaced spur gears fitted to a common spindle that is rotatively journalled relative to the planet wheel carrier via a needle bearing; and
    wherein one of the two axially spaced spur gears is rigidly secured to the common spindle, and the other one of the two axially spaced spur gears is supported on the common spindle via a wringing fit for self alignment with the rigidly secured spur gear, thereby evenly sharing a load between the two axially spaced spur gears.

2. A hand-held power nut runner according to claim 1, wherein the planet wheel carrier of said at least one of the planetary gearing stages is coupled to the output shaft.

3. A hand-held power nut runner according to claim 1, wherein the sun gear of said at least one of the planetary gearing stages forms part of a planet wheel carrier of a preceding planetary gearing stage.

4. A hand-held power nut runner according to claim 2, wherein the sun gear of said at least one of the planetary gearing stages forms part of a planet wheel carrier of a preceding planetary gearing stage.

* * * * *